May 11, 1965 R. S. HARRIS 3,183,143
STRUCTURAL SHAPES OF REINFORCED SULFUR
AND METHOD OF PRODUCING SAME
Filed May 15, 1961 2 Sheets-Sheet 1

INVENTOR.
RANSOM S. HARRIS
BY
ATTORNEYS

May 11, 1965

R. S. HARRIS 3,183,143

STRUCTURAL SHAPES OF REINFORCED SULFUR
AND METHOD OF PRODUCING SAME

Filed May 15, 1961

INVENTOR.
RANSOM S. HARRIS
BY
ATTORNEYS

United States Patent Office 3,183,143
Patented May 11, 1965

3,183,143
STRUCTURAL SHAPES OF REINFORCED SULFUR
AND METHOD OF PRODUCING SAME
Ransom S. Harris, Newark, Ohio, assignor to Owens-Corning Fiberglas Corporation, a corporation of Delaware
Filed May 15, 1961, Ser. No. 110,231
16 Claims. (Cl. 161—176)

This invention relates to reinforced sulfur and more particularly to structural shapes made of reinforced sulfur and to methods of making the same.

Sulfur is an important and plentiful element finding many uses as a chemical in industry. It is chemically inert and accordingly is very resistant to attack and erosion by most reagents, being resistant to a wide variety of solvents including hydrocarbons, acids and the like as well as being substantially inert and insoluble in water. In fact sulfur is capable of withstanding hot water, inasmuch as its melting point of 118° C. (244.4° F.) is higher than the boiling point of water, 100° C. (212° F.). Sulfur is even resistant to carbon disulfide, in which it is very slowly dissolved. Additionally, sulfur has excellent electrical insulation characteristics. Further, a sulfur is an inexpensive and readily available material.

However, sulfur is a very brittle material and because of this characteristic has not heretofore been considered applicable for the production of structural shapes. If it were possible to reinforce sulfur to produce structural shapes, it could be used in many applications in competition with wood, plastic and metals.

Accordingly, a step forward in the art of new structural materials would be provided if sulfur could be reinforced and therefore rendered useful for the production of structural shapes such as pipes for sewer lines, electrical conduits, support rods, plates, beams and the like.

It is therefore an important object of the present invention to provide reinforced sulfur adapted for the production of structural shapes.

Another object is to provide a method for producing structural shapes from reinforced sulfur.

A further object is to provide a composite body of amorphous sulfur reinforced with glass fibers.

Another object is to provide a composite body of sulfur reinforced with silicious fibers.

Other objects of this invention will appear in the following description and appended claims, reference being had to the accompanying drawings forming a part of this specification wherein like reference characters designate corresponding parts in the several views.

Briefly the present invention relates to reinforced bodies of sulfur and to a method for their production by incorporating reinforcement fibers of glass or their equivalent with molten sulfur, which is thereafter cooled to provide a functional structural shape.

The method of the present invention will now be described with reference to the drawings which illustrate the production of rods, pipes and plates in accordance with the present invention.

PRODUCTION OF RODS

Figure 1:
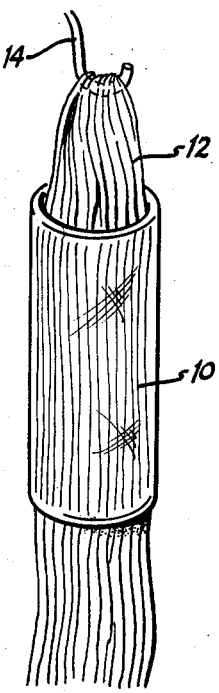
FIGURE 1 is a perspective view showing continuous glass fibers being drawn into a cylindrical mold.

As shown in FIGURES 1 through 4, there is illustrated a method for producing a reinforced rod of sulfur. In FIGURE 1 a tubular mold 10 is shown being filled with a plurality of continuous fibers. The continuous fibers are in the form of continuous strands, each of which includes approximately 200 individual continuous fibers held together in strand form by a temporary binder such as starch or the like. The strands 12 are doubled and at their median portion are looped over a hook 14 previously inserted through the tubular mold 10 and then drawn upwardly as shown in FIGURE 1. In this manner the tubular mold 10 is loaded with continuous fibers oriented substantially parallel to one another.

Figure 2:
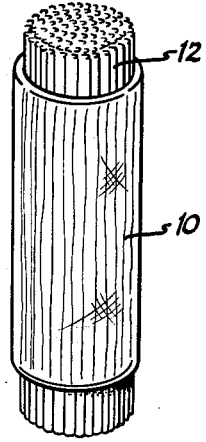
FIGURE 2 is a view similar to FIGURE 1 showing glass fibers packed into a cylindrical mold and trimmed.
Figure 3:
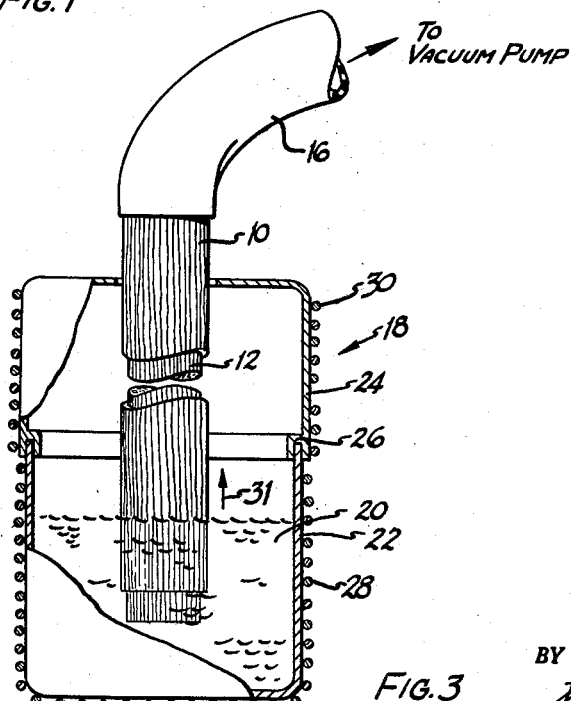
FIGURE 3 is a view showing the packed mold of FIGURE 2 connected at one end to a vacuum hose and inserted at its other end into a molten body of sulfur.

As shown in FIGURE 2 the hook 14 has been removed and the strands 12 trimmed adjacent the upper and lower ends of the tubular mold 10. Thereafter, as shown in FIGURE 3, a vacuum hose 16 is fitted over one end of the tubular mold 10 and the other end of the mold is inserted into a container 18 having a body of molten sulfur 20 therein. The container 18 suitably includes a bottom 22 and a top 24. The top 24 is provided with a lip 26 whereby it can rest upon the bottom 22 in supporting engagement. The bottom 22 of container 18 is surrounded with heating coils 28 to heat the same and thereby provide the molten body of sulfur 20. Additionally, the top 24 of container 18 is also provided with heating coils 30 to keep the atmosphere above the molten body of sulfur 20 at the temperature of the molten sulfur to thereby heat the tubular mold 10 and the continuous strands of glass fibers 12 placed therein.

With the arrangement shown in FIGURE 3, a vacuum is applied to the vacuum hose 16 and the molten sulfur from the body 20 is drawn upwardly in the arrow 31 direction, to fill the mold 10 with molten sulfur and the interstices or voids between the continuous fibers 12. When the mold 10 is completely full of molten sulfur, it is withdrawn from the container 18 and cooled. This causes the sulfur to solidify and thereafter the tubular mold 10 is removed. According to one practice of this invention, the tubular mold 10 was in the form of a glass tube; this was removed by fracturing after the molten sulfur had cooled and solidified.

Figure 4:
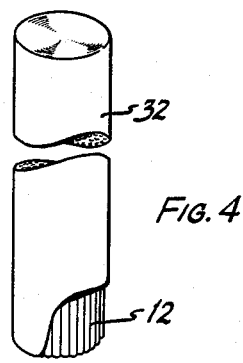
FIGURE 4 is a perspective view of a reinforced rod of sulfur made in accordance with the present invention.

As shown in FIGURE 4, a reinforced rod, made in accordance with the steps illustrated in FIGURES 1, 2 and 3, is provided. The continuous fibers 12 are retained in their aligned relationship and are coated with a thin layer 32 of solidified sulfur. It has been found that rods made in this manner, as will be further illustrated in examples contained herein, have surprisingly high flexural strength as reflected by a high modulus of fracture, on the order of 20,000 pounds per square inch.

Although in FIGURE 3, sulfur has been illustrated as being drawn into the mold 10 by a source of vacuum, it is to be considered within the scope of the invention that the sulfur can be forced into the top of the mold 10 through a tube from a pressurized body of molten sulfur.

Figure 5:
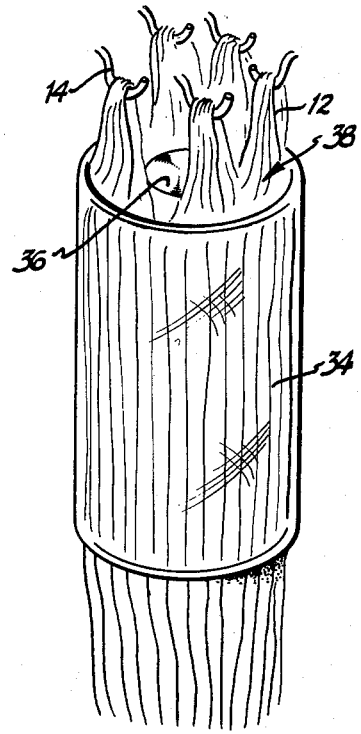
FIGURE 5 is a perspective view of a mold being filled with a plurality of groups of continuous glass fibers for the production of a pipe made of reinforced sulfur.

In FIGURE 5, there is illustrated a method of making pipes or conduits in accordance with the present invention. For this purpose, an outer mold member 34 of tubular configuration is provided. Concentrically within the outer mold member 34 there is positioned an inner mold member 36 of cylindrical configuration and closed at each of its ends. To load the tubular space 38 between the outer mold members 34 and the inner cylindrical mold member 36, with continuous glass fibers, a plurality of hooks 14 are first passed downwardly through the tubular space 38 between the mold members and continuous strands 12 are looped thereover; the hooks are then drawn upwardly in the same manner as described in FIGURE 1. Thereafter, the fibers are suitably trimmed as illustrated in FIGURE 2 and then the loaded mold is filled with molten sulfur by vacuum injection as illustrated in FIGURE 3, or by pouring or forcing sulfur downwardly from the top through the fibrous mass. After the tubular space 38 is filled with molten sulfur and is suitably cooled to form a rigid shape, the mold members 34 and 36 are removed. As previously described, these mold members may be made of glass or other disposable ceramic molding material which is broken away to leave a reinforced sulfur body in the form of a pipe.

Thus it will be seen that rods and tubes or pipes can be made in accordance with the present invention. In this regard, it is to be considered within the scope of the invention to make conduits of square or rectangular configuration utilizing appropriately shaped outer and inner molds. Thus a rectangular outer mold could be utilized with a smaller rectangular inner mold or if desired a cylindrical inner mold to provide an appropriate conduit opening. Thus, modifications of the illustrative embodiment of FIGURE 5 are to be included within the scope of the present disclosure.

The following example will illustrate the manner in which reinforced rods have been made in accordance with the present invention.

*Example I*

A Pyrex glass tube having an inside diameter of approximately ¼ inch was packed with parallel oriented strands of continuous glass fibers by pulling looped strands therethrough with a wire hook. Thereafter one end of the tube was attached to a vacuum pump and the other end immersed in a molten body of sulfur, the tube and glass fibers being retained at the temperature of the body of the molten sulfur. Thus, molten sulfur was forced into the tube by atmospheric pressure to fill the interstices between the fibers and join the surfaces of the fibers in bonded relationship. A vacuum injected glass fiber reinforced sulfur body was thereby produced. Upon cooling to room temperature, the tubular mold was removed by breaking it away from the reinforced rod.

The product was in the form of a ¼ inch diameter rod containing about 70% by weight of sulfur and approximately 30% by weight of glass fibers.

Rods 6 inches long and ¼ inch in diameter were tested for flexural strength. Fourteen rods were tested and provided an average breaking strength of 20,000 p.s.i.

PRODUCTION OF PLATES

Figure 6:
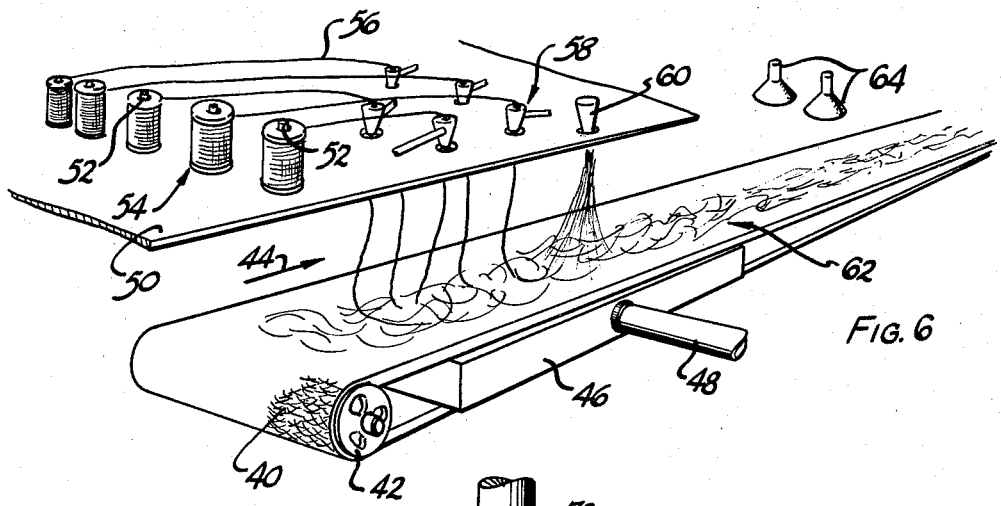
FIGURE 6 is a perspective view of apparatus adapted for the production of glass fiber mats for use in preparing structural shapes of reinforced sulfur in accordance with the present invention.
Figure 7:
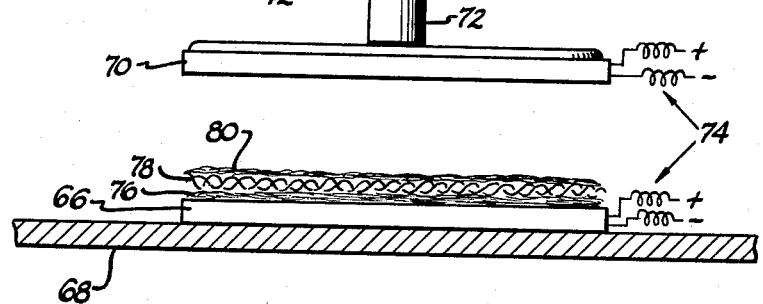
FIGURE 7 is a schematic view showing a glass fiber mat and sulfur placed between the platens of a press.
Figure 8:
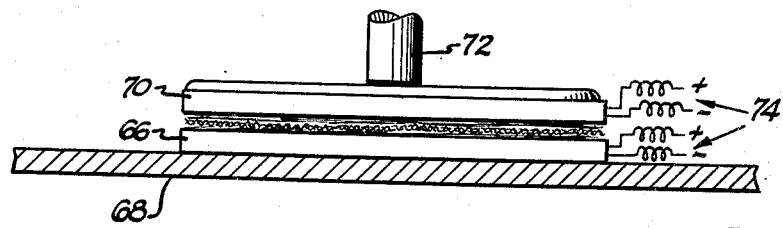
FIGURE 8 is a schematic view similar to FIGURE 7 showing the press closed to bond the sulfur and glass fiber mat into a reinforced plate-like structure.

As shown in FIGURES 6–8 of the drawings, plates of reinforced sulfur can be made in accordance with the present invention. These plates may embody randomfiber mats as reinforcement materials and for this purpose, the manufacture of a random-fiber mat is illustrated in FIGURE 6. As there shown, a continuous foraminous belt 40 is supported for movement upon a rotatable roller 42 suitably journaled for rotation in bearings mounted upon a support frame (not shown). The belt 40 is adapted for movement in the arrow 44 direction by a suitable means, such as an electric motor drivingly connected to one or the other of the belt support rollers typified by roller 42. A suction box 46 is positioned beneath the upper flight of the belt 40 for drawing atmospheric gases therethrough. For this purpose, an exhaust conduit 48 is connected into one side of the suction box 46 and leads to a suitable fluid pump such as a fan or the like.

Positioned above the upper flight of the continuous foraminous belt 40 there is provided a support floor 50. Upon the support floor 50 there is positioned a plurality of upright spindles 52 adapted to support spools of continuous strand 54. The individual strands 56 from the spools 54 are threaded through air venturi nozzles 58 whereby they are directed downwardly upon the upper surface of the continuous foraminous belt 40. The rate of feeding of the continuous strands 56 is synchronized with the rate of movement of the upper flight of the continuous belt 40 to provide a mat of selected thickness. Although not shown, downwardly directed side walls extend from the support floor 50 to a point adjacent the top of the upper flight of the belt 40 to provide most effective direction of the continuous fibers 56 against the upper flight of the belt 40 and to prevent entry of extraneous materials such as dust or the like. Spray nozzles 60 are provided to direct a temporary binder downwardly upon the mat as it is formed. By so operating, the continuous strands 56 are directed against the upper flight of the foraminous conveyor 40 in a swirling type of configuration; concomitantly the strands are coated and bonded together lightly at their intersections by the temporary bonding medium such as an aqueous starch suspension. As the continuous mat 62 leaves the formation zone of the suction box 46, it is heated as by infrared heaters 64 to remove the moisture content from the binder and provide a dry mat. Although not shown, the mats can either be rolled into a continuous roll or cut into suitable lengths or sizes for appropriate utilization.

For purposes of the present invention the mat 62 may be cut into suitable sizes as for example circles useful in the production of plates as shown in FIGURES 7 and 8.

As illustrated in FIGURE 7, a two element press can be utilized for production of plates in accordance with this invention. Thus the press may include a lower platen 66, placed upon a suitable support 68 and an upper platen 70 movable through an arm 72 as for example by hydraulic means (not shown). Each of the upper and lower platens 66 and 70 is provided with internal heating coils of a suitable type, the exemplary embodiment including electrical connections 74.

With the press platens separated, as shown in FIGURE 7, a layer of sulfur 76 is first placed upon the lower press platen 66 and thereafter one or more layers of randomfiber mat indicated at 78 are placed upon the bottom layer or sulfur 76. Thereafter an upper layer of sulfur 80 is sprinkled over the mat layer or layers 78 in a manner to be intimately commingled therewith. Then, as shown in FIGURE 8, the press platens are brought together with heating, to melt the sulfur and cause it to flow into intimate bonding relationship with the fibrous mat layer or layers 78 to provide a homogenous plate of sulfur reinforced with randomly arranged continuous glass fibers.

As illustrative of the foregoing method of producing plates in accordance with the present invention, the following examples are provided.

*Example II*

This example illustrates the production of a body of reinforced sulfur with random continuous glass fiber mat containing from about 5–7% by weight of glass.

A mat of randomly oriented, continuous glass fibers of E-glass in strand form, of approximately 1/32 to 1/16 inch thickness and containing a small amount of temporary starch binder was formed into a sandwich several layers thick. This mat was positioned in a container and covered with powdered elemental sulfur. The composite was then placed in an oven and heated to 370° F. and retained at that temperature for a period of about 1.5 hours, followed by fairly rapid cooling to room temperature.

The composite body was made in two steps. In the first step, 222.2 grams of sulfur was applied to 13.5 grams of mat. In a second step, the mat was provided with 75 grams of additional sulfur and heated in the same manner as in step No. 1.

Two portions of the composite body were removed and machined into tensile flexure bars and tested for flexural strength and modulus to provide the following test results.

|  | Sample No. 1, p.s.i. | Sample No. 2, p.s.i. |
| --- | --- | --- |
| Transverse directional flexural strength | 2,260 | 4,620 |

With respect to sample No. 1, the sulfur was removed and the glass content determined to be 4.8% of the total weight of the body.

ADDITIONAL PLATE STRUCTURES

In addition to plates wherein random mats of continuous strand are utilized as reinforcement materials, plates may be made by using chopped strand as a reinforcing material for sulfur in accordance with the present invention. To illustrate this aspect of the invention, the following example is provided.

Example III

E-glass roving was chopped into 1 inch lengths so that it was substantially dispersed into individual lengths of strand. These lengths were then admixed with powdered elemental sulfur in a ratio of about 5% by weight of glass to about 95% by weight of sulfur and the sulfur was then melted to bond the fibers and form a composite body from which test samples were machined. The samples were tested for flexural strength and provided the following results:

|  | Sample No. 1, p.s.i. | Sample No. 2, p.s.i. |
| --- | --- | --- |
| Flexural strengths (breaking strength determined by applying a bending stress) | 1,250 | 704 |

An average of the two samples provided a flexural strength of 975 p.s.i.

ADDITIONAL ASPECTS OF THE PRESENT INVENTION

The foregoing description has included the formation of reinforced bodies of sulfur by a vacuum injection casting method; by pressure molding and by heating an admixture of sulfur and glass fibers followed by cooling. In addition to the foregoing, it is to be considered within the scope of the invention to form structural shapes by other methods. Thus these would include post forming a sheet or plate of sulfur reinforced with glass fibers as by placing such a sheet or plate in a heated atmosphere and when the plate becomes softened, to press it into a desired configuration between appropriately shaped dies. Thus cup-like shapes, hemispherical shapes, angles, U-shaped channels, box-like structures and the like can be produced. Additionally, it is to be considered within the scope of the present invention to cast articles from an admixture of molten sulfur and reinforcement fibers, using suitable molds. The casting technique would include the use of pressure to force the mass of sulfur and admixed fibers into all portions of the mold, and centrifugal methods can be employed.

REINFORCEMENT FIBERS

In view of the foregoing description, it will be appreciated that fibers of high strength are preferred for use in the present invention. Accordingly, continuous glass fibers provide a preferred reinforcement material and these may be present in the form of continuous strands oriented in parallel alignment to give rod articles of high strength as brought out in Example 1 or to provide strong plates as brought out in Example 2 where the fibers are utilized in the form of random mats. The fibers also may be used in the form of chopped strands or roving as brought out in Example 3. In addition to glass fibers of continuous nature, however, it is to be considered within the scope of the invention to utilize other types of fibers of lesser strength, but which may be valuable for the purpose of filling the bodies to impart desirable physical characteristics thereto. Thus silicious fibers broadly are to be included within the scope of the invention and these include glass in both continuous and staple form, quartz, asbestos, aluminum silicate and others.

In addition to the types of fibers which may be included in bodies made in accordance with the present invention, it may be desirable in some instances to include additives or fillers such as calcium carbonate, wetting agents and clay. These materials may be desirable for enhancing the properties of bodies made by the invention, as for example the electrical insulation characteristics. When employing the additives or fillers, however, it is preferred to use only small amounts to avoid impairment of the strength characteristics imparted by the reinforcement fibers.

As regards the addition of silicious fibers other than the high strength glass fibers and the addition of additives or fillers, it is within the scope of the invention to use these materials in admixture with the glass reinforcement fibers to supplement the desirable strength properties imparted by the glass.

In accordance with the invention, sulfur can be present in the range from about 50% by weight to about 99% by weight of the composite bodies. Accordingly, by difference, the amount of fibers and fillers would be in the range from about 1% to about 50% by weight. A preferred amount of reinforcement fibers will be in the range from about 15% by weight to about 30% by weight, particularly when using parallel oriented fibers. When utilizing random fibers which would include both staple fibers and chopped continuous fibers, a preferred range of from about 5% to about 20% by weight of fibers is utilized. Thus a general preferred amount of reinforcement glass fibers will be in the range from about 5% by weight to about 30% by weight of the body.

A unique feature of glass reinforced sulfur articles made in accordance with the present invention is that the glass fibers appear to stabilize the sulfur in its allotropic form and hinder the reversion of the sulfur to its crystalline state. Thus the sulfur is retained in the amorphous state.

I claim:

1. A rigid, composite body having a high modulus of fracture, and comprising amorphous sulfur and lengths of continuous glass strands wherein the sulfur is stabilized in its allotropic form and thereby hindered from reversion to its crystalline state by the glass strands.

2. A reinforced, rigid, composite body, comprising sulfur in amorphous form in an amount from about 70% by weight to about 95% by weight, and lengths of continuous silicious fibers distributed in said sulfur in an amount from about 5% by weight to about 30% by weight, the fibers being effective to hinder the sulfur from reverting to its crystalline state.

3. A rigid, reinforced, composite body having a high modulus of fracture, comprising amorphous sulfur in an amount from about 70% by weight to about 95% by weight, and randomly oriented lengths of continuous glass strands uniformly distributed in said sulfur in an amount from about 5% by weight to about 30% by weight, the strand lengths being effective to hinder the sulfur from reverting from the amorphous state.

4. A rigid, sulfur-glass strand reinforced composite body having a high modulus of fracture, comprising parallel oriented and aligned adjacent continuous glass strands and having the interstices therebetween filled with and the surfaces thereof coated with sulfur and containing about 30% by weight of fibers and about 70% by weight of sulfur.

5. A rigid rod of sulfur reinforced with glass strands and having a high modulus of fracture, comprising parallel oriented and aligned adjacent continuous glass fibers formed into the shape of a rod and having the interstices therebetween and the surfaces thereof coated with sulfur and containing about 30% by weight of glass fibers and about 70% by weight of sulfur.

6. A rigid body of sulfur reinforced with glass strands and having a high modulus of fracture, the strands being present in the form of a random mat of continuous glass strands and the sulfur being present as a matrix surrounding said fibers in bonding, coating relationship, said fibers comprising from about 5% to about 20% by weight of the body.

7. A rigid body of amorphous sulfur reinforced with glass fibers and having a high modulus of fracture, the fibers being present in the form of chopped strand and the sulfur being present as a matrix surrounding said fibers in bonding-coating relationship, said fibers comprising about 5% by weight of the body and the sulfur comprising about 95% by weight of the body, whereby the sulfur is stabilized in its allotropic form and thereby hindered from reversion to its crystalline state.

8. In a method of producing rigid shapes of reinforced, amorphous sulfur having a high modulus of fracture, the steps of admixing particles of elemental sulfur with chopped glass strand in a ratio of about 5% by weight of glass to about 95% by weight of sulfur, heating the admixture to melt the sulfur and wet the fibers in bonding relation, cooling the bonded mass, and forming a shape from said cooled and bonded mass, whereby the sulfur is stabilized in its allotropic form and thereby hindered from reversion to its crystalline state.

9. In a method of producing rigid shapes of reinforced amorphous sulfur having a high modulus of fracture, the steps of arranging a plurality of continuous glass strands in parallel adjacent, contacting alignment, surrounding said strands in coating relationship with molten sulfur, and cooling the mass so formed, whereby the sulfur is stabilized in its allotropic form and thereby hindered from reversion to its crystalline state by the glass strands.

10. In a method of producing a rigid, plate-like structure of reinforced sulfur having a high modulus of fracture, the steps of admixing particulate sulfur into a reinforcing mat of continuous glass strands in intimate relationship, subjecting said admixture to pressure at a temperature sufficient to melt said sulfur whereby the molten sulfur is forced into the interstices between said strands in bonding relationship, and cooling the mass to reduce the sulfur to amorphous form, whereby the sulfur is stabilized in its allotropic form and thereby hindered from reversion to its crystalline state by the glass strands.

11. A rigid, structural shape having a high modulus of fracture and consisting essentially of solidified amorphous sulphur having disposed therein a plurality of glass strands, the strands constituting a minor portion by weight of the shape, reinforcing the sulfur and inhibiting the reversion of the sulfur from amorphous to crystalline form.

12. In a rigid, glass fiber-reinforced sulfur body having a high modulus of fracture,
 a mass of amorphous sulfur comprising from about 70% to about 95% of the weight of the body,
 lengths of continuous glass strands within said body and coated with said sulfur and oriented in a common axial direction and packed closely adjacent and in substantially contacting relation to one another,
 and said strands comprising from about 5% to about 30% of the weight of the body and stabilizing the sulfur in its allotropic form.

13. In a method of producing a rigid shape of reinforced sulfur having a high modulus of fracture,
 the steps of
 admixing lengths of continuous glass fibers oriented in a common axial direction and packed closely adjacent one another with powdered sulfur,
 heating said admixture to melt the sulfur and form a pliable body,
 forming the pliable body into a shape,
 and cooling to solidify the shape, with the sulfur in amorphous form, whereby the sulfur is stabilized in its amorphous condition by the glass strands.

14. In a method of producing a rigid shape of sulfur reinforced with continuous glass fibers to produce a high modulus of fracture,
 the steps of
 forming a random mat of continuous glass fibers in strand form several layers thick on a molten sulfur-retaining surface,
 covering the mat with powdered sulfur to form a composite body,
 heating the composite body to melt the sulfur and bond to the strands of the mat,
 and rapidly cooling the composite to room temperature.

15. In a composite body having a high modulus of fracture,
 a mass of amorphous sulfur,
 and lengths of continuous glass fibers within said body and oriented in a common axial direction and packed closely adjacent one another, whereby the sulfur is stabilized in its amorphous form.

16. In a composite mass having a high modulus of fracture when solidified,
 sulfur in molten form,
 and lengths of continuous glass fibers oriented in a common axial direction and packed closely adjacent one another and dispersed through the sulfur.

References Cited by the Examiner
UNITED STATES PATENTS

| | | | |
|---|---|---|---|
| 894,799 | 7/08 | Ricketts et al. | 264—122 |
| 2,305,209 | 12/42 | Treichler et al. | 18—26 |
| 2,498,325 | 2/50 | Zemanek et al. | 18—58 |
| 2,547,691 | 4/51 | Churchill | 18—55 |
| 2,771,387 | 11/56 | Kleist et al. | 156—32 XR |
| 2,803,043 | 8/57 | Stephens | 18—26 |
| 2,877,501 | 3/59 | Bradt. | |
| 2,951,780 | 9/60 | Bushman. | |
| 3,055,058 | 9/62 | Hartesveldt | 264—102 |
| 3,084,088 | 4/63 | Hunkeler | 264—102 |

EARL M. BERGERT, *Primary Examiner.*

CARL F. KRAFTT, *Examiner.*